L. J. SMITH.
Improvement in Lock-Nuts.
No. 115,249.   Patented May 23, 1871.
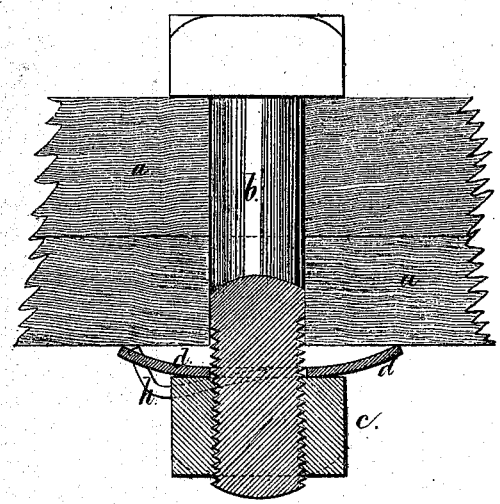
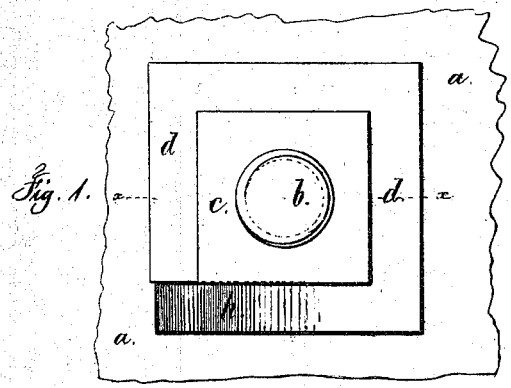
Witnesses,
Chas. H. Smith
Geo. D. Walker
Inventor,
Loyst J. Smith
Lemuel W. Serrell
atty.

United States Patent Office.

LOYST J. SMITH, OF NEW YORK, N. Y., ASSIGNOR TO HIMSELF AND HENRY D. BLAKE, OF SAME PLACE.

Letters Patent No. 115,249, dated May 23, 1871.

IMPROVEMENT IN LOCK-NUTS.

The Schedule referred to in these Letters Patent and making part of the same.

*To all whom it may concern:*

Be it known that I, LOYST J. SMITH, of the city, county, and State of New York, have invented and made a certain new and useful Improvement in Washers for Nuts; and the following is hereby declared to be a full and correct description of the same.

A washer for the nuts of screw-bolts has heretofore been made in which a spring pawl cut out and bent up from the metal of the washer has been made use of to lock the nut and prevent its working loose. This pawl was concentric with the bolt-hole, and engaged with teeth upon the inner face of the nut.

A cup-shaped washer has also been employed to retain the nut in its proper position, but no locking device was used in connection with such washer, the nut being prevented from turning only by the spring of the metal washer keeping it tightly against the face of the nut.

A flat metal washer has also been used to prevent the nut turning, the nut being first screwed to place and then held by one or more of the edges of the washer being turned or bent up against the side of the nut.

My invention, as distinguished from those above described, consists in a metal washer of convex form, provided with a spring tongue, made by a longitudinal incision at the edge of the washer, and this tongue is bent so that it allows the corners of the nut to pass over it in tightening up the nut, but immediately springs up after the corner of the nut passes off the tongue, and holds said nut by its edge resting against one of the sides of the nut; and I bend the outer end of the tongue downward, so that it rests against the article upon which the washer is placed, and is, consequently, not likely to be caught and broken off by passing objects, nor to lose its spring, because it is supported at both ends.

This washer is especially intended to be used upon the fish-plates of railroad bars, but it is adapted for general use, as it is so very simple in construction, cheaply made, and is easily applied; and also because the nut can be removed without injury to the washer or nut by simply pressing the spring tongue against the article to which it is placed while the nut is being unscrewed.

In the drawing—

Figure 1 is an elevation of my improved washer with a nut screwed to place, and

Figure 2 is a section at the line $x\ x$.

$a$ represents the pieces of wood or metal to be secured by the bolt $b$ and nut $c$, and said bolt and nut are of the usual character and need not be further described, as they do not require any change in their construction to adapt them to be used with my locking spring washer $d$.

This spring-washer $d$ is made as a section of a cylinder, and is to be of suitable size and strength, according to the use to which it is to be put, and, when used upon the fish-plates of railroad bars, the washer should be of such size that either the top or lower edge touched against the under side of the rail-head or against the top of the base of the rail, so as to entirely prevent the washer turning upon the bolt; but said washer may be held by the clamping action of the nut $c$; or, if convenient, an edge or corner of the washer may be bent, so as to set over an edge or corner upon the article to which it is applied.

$h$ is the locking spring tongue, and this is formed by making a longitudinal cut in the metal of the washer, extending from the side of the washer, so that the nut can be screwed to place, and the corners of the nut, as they come around in succession, press down said tongue.

This tongue is bent, as shown in fig. 2, the same curving upward from the end of the cut, so as to rise sufficiently above the surface of the washer and hold the nut by the side of the tongue coming against one of the sides of the nut. The outer end of the tongue is bent downward, so as to rest upon the surface of the article upon which it is placed, and support the spring tongue at the outer end.

The washer, being a segment of a cylinder, forms a reliable spring, and the tongue effectually prevents the nut working loose.

I claim as my invention—

1. The metallic washer, made as a segment of a cylinder, with the spring tongue upon one side thereof, to hold the nut in the manner specified.

2. The spring tongue $h$, with the outer end turned back to take a bearing so as to support the tongue at both ends, as and for the purposes specified.

Signed by me this 3d day of April, A. D. 1871.

L. J. SMITH.

Witnesses:
CHAS. H. SMITH,
GEO. T. PINCKNEY.